UNITED STATES PATENT OFFICE.

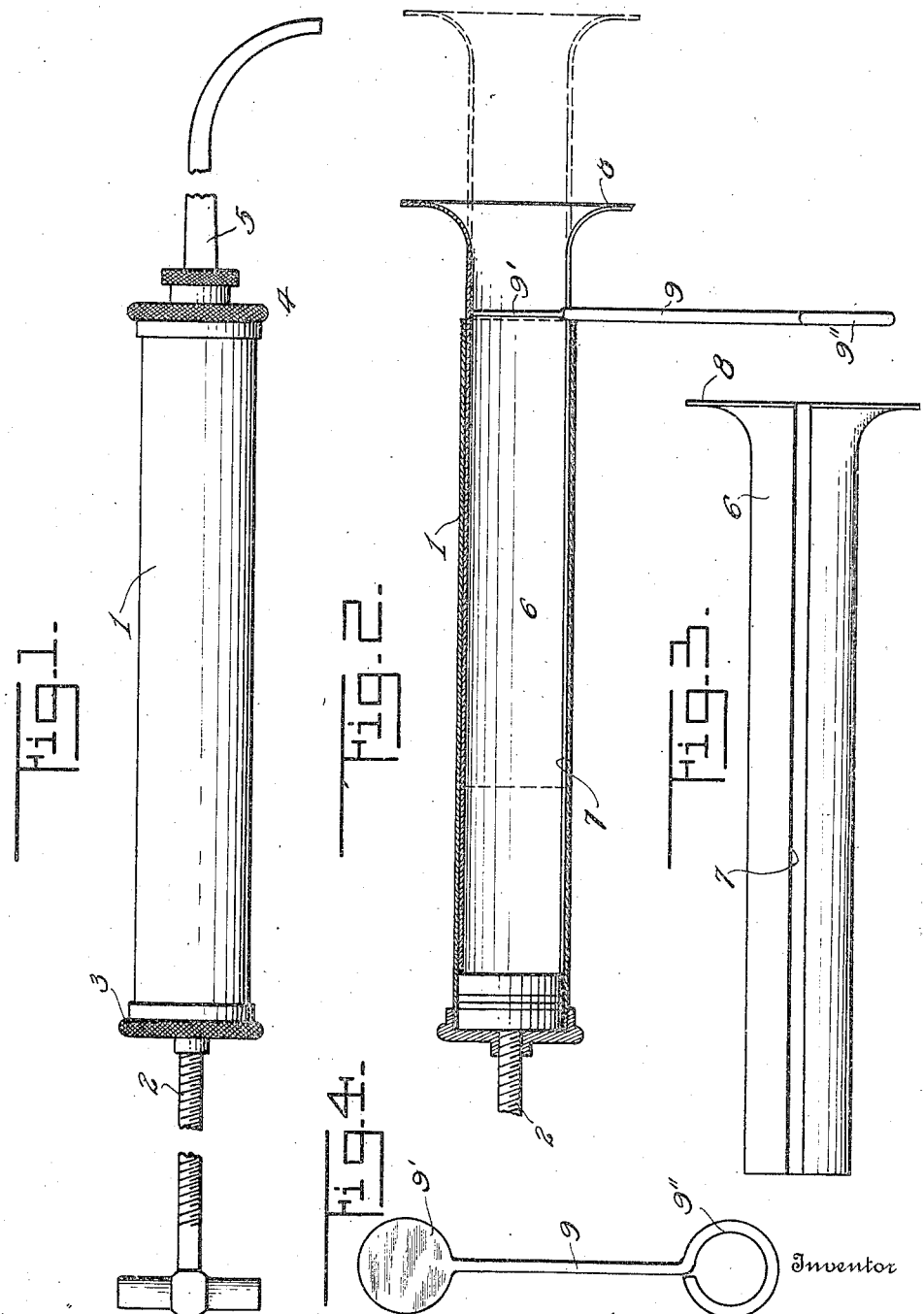

WILLIAM HOVEY EDMUNDS, OF LEESBURG, VIRGINIA.

GREASE-GUN-FILLING DEVICE.

1,110,909.  Specification of Letters Patent.  Patented Sept. 15, 1914.

Application filed January 12, 1914. Serial No. 811,647.

*To all whom it may concern:*

Be it known that I, WILLIAM HOVEY EDMUNDS, a citizen of the United States, residing at Leesburg, in the county of Loudoun and State of Virginia, have invented certain new and useful Improvements in Grease-Gun-Filling Devices, of which the following is a specification.

This invention relates to improvements in filling apparatus for grease guns, the novel feature of which consists in the provision of filling means adapted for coöperation with devices of this character to facilitate the operation of filling the same.

The primary object in view is the provision of a simple filler device or apparatus which can be easily and cheaply manufactured for use with any of the well known types of grease guns and consists essentially of a cylindrical shell into which the semi-liquid or solid lubricant is initially introduced by the aid of a coacting ladle member, said shell then being inserted into the grease receptacle of substantially corresponding capacity to effect the transfer of said lubricant thereto through the coöperation of the ladle member aforesaid.

To best understand the novel characteristics of this device it may be stated that it is commonly known to those skilled in the art to which the invention refers that the filling of a grease gun to the extent of its capacity is extremely difficult, if not substantially impossible, so that the operation of furnishing a motor or similar vehicle with lubricant of this character, such for example as supplying the differential or gear housings, is accomplished with much labor and loss of time due to the fact that the quantity capable of being introduced into the gun at one time is so small. More specifically speaking, it is customary, for instance, to remove the nozzle from one end of the barrel of a grease gun after retracting the plunger toward the other end and insert small quantities of the grease at a time, pressing the same down, generally, with a stick or similar article, but by reason of the fact that the air escapes so slowly from the barrel, it is practically impossible to get any quantity near the capacity of the receptacle therein, or even when the air is allowed to pass out freely from the barrel as the filling action takes place, the friction of the grease on the walls of the barrel is so considerable as to resist any material filling of the same. Furthermore, the use of a plunger member for forcing the grease downwardly becomes impractical because upon the withdrawal of said member the grease is sucked outwardly therewith. By actual experience I have also found that for various reasons to suck grease into the gun by the plunger member provided for forcing it therefrom, as is customary, results in drawing but a negligible quantity into the same, due perhaps to the nature of the lubricant. It has also been proposed to plunge the barrel of a grease receptacle of this character bodily into a bucket of grease but it is rare that the bucket contains lubricant of a depth equivalent to the length of the gun and therefore this is not feasible. To the end of overcoming these difficulties and disadvantages I have conceived of a simple device by which the grease initially placed into a shell-like filler member to the full capacity of the same may be inserted into the grease receptacle and by introducing the ladle member hereinbefore mentioned into the filler member said grease may be bodily transferred to the receptacle upon the withdrawal of said filler member.

With the above and other objects in view, this invention consists in the construction, combination and arrangement of parts all as hereinafter more fully described, claimed and illustrated in the accompanying drawings, wherein:

Figure 1 is a view in elevation of a grease receptacle of the usual type and with such as my invention is designed to coöperate; Fig. 2 is a longitudinal sectional view showing my filler device in coöperating position, and in dotted lines the shell element partially withdrawn; Fig. 3 is an elevation of the shell member alone; and Fig. 4 is a plan view of the ladle member.

Throughout the following detail description, and on the several figures of the drawings, similar parts are referred to by like reference characters.

Referring to the drawings, Fig. 1 illustrates a grease gun of the ordinary type comprising the barrel or cylindrical receptacle 1 having a threaded plunger or piston 2 operable therein and passing through the knurled closure member 3 detachably connected to one end of the barrel. The other end of the barrel is likewise provided with a knurled closure cap 4 screwed thereon and to which is detachably connected the nozzle 5 through which grease is adapted to be forcibly ejected by movement of the plunger 2 in the barrel, the usual operation of these devices. For such I provide a cylindrical shaped or tubular shell 6 having at one side a slot 7 extending longitudinally from one end of the same to the other. One end of this shell is bell-shaped or flared, as indicated at 8, to facilitate manipulating the same, as will be more clearly set forth hereinafter. Into this shell, shown most clearly in Fig. 3, grease, known commercially as cup or journal grease, is introduced by a ladle member 9, constructed similar to the embodiment shown in Fig. 4, which comprises the disk 9′ adapted to be inserted into said shell, and the actuating means or handle therefor, 9″, which passes through the slot 7 during the filling operation now to be more clearly described.

Having first retracted the plunger 2 of the gun and removed the nozzle and cap members from the same, the shell 6 is held in one hand, preferably placed over the smaller end, and grease is then picked up by the ladle member 9 by which it is pressed into the shell toward the hand on the smaller end aforesaid, whereupon said ladle member is rotated so as to enable the disk to be withdrawn through the slot. As will be appreciated, this removal of the ladle member from the shell at any point in the length of the same serves a particular function in that the grease is prevented from being withdrawn from the shell by suction in the action of retracting said member from the filling end. The thickness of the material of the disk is preferably slightly less than the width of the slot 7, of course, and in the action of withdrawal of this member through the slot any of the grease adhering to its surfaces will be scraped off by the edges of said slot. The filling action just described is continued until the shell is quite full to its capacity, when it is inserted bodily into the barrel 1 of the grease gun. The ladle member is then inserted on top of the grease in a position best shown in Fig. 2, and holding the same rigidly in this position, the operator grasps the shell 6 about the flared end and withdraws the same entirely from the barrel, thus leaving the full quantity of grease or contents of the shell therein which may then be ejected into the machine or other place of deposit by the usual actuation of the plunger 2. It is to be understood, of course, that the shell member is of sufficient rigidity to enable the proper performance of this function hereinbefore set forth, but it is preferably made sufficiently yieldable that upon application of slight pressure it may be contracted slightly, by reason of the slot therein, to facilitate the introduction of the member into the barrel of the grease receptacle. It is to be mentioned also that it is within the purview of the use of my filler device that the same need not necessarily be inserted entirely within the grease receptacle since obviously the contents of the shell might readily be forced therefrom if one end of the same were to be placed at the mouth or opening of a receptacle to receive the grease, when holding the ladle member on top of said grease by movement of said member downwardly in the slot. The relative action of the shell or ladle member is obviously immaterial, that is to say, whether the shell member is moved while the ladle member is held rigidly, or vice versa.

Having thus described my invention, what I claim as new is:—

1. A filler device of the class described comprising a shell, a rotatable filler member operable in said shell for filling the same and moving the contents therealong, and manipulative means for rotating the filler member to permit withdrawal of the same away from the contents introduced into the shell thereby.

2. A filler device of the class described comprising a shell, a ladle member operable in said shell to fill the same, said member being of a cross sectional area substantially conforming to the cross section of the shell, and a handle member connected to the ladle member and operable to rotate said ladle member to permit withdrawal of the same away from the contents and out of the shell.

3. The combination, with a receptacle for grease, of a shell adapted to be inserted therein and having a slot at one side, a rotatable member operable in the shell for transferring the contents of the same into the receptacle aforesaid upon withdrawal of the shell therefrom, and actuating means for said rotatable member extending through the slot.

4. A filler device for grease guns comprising a hollow tubular member having a slot at one side and a rotatable ladle member operable in said tubular member for filling the same, said ladle member comprising actuating means extending through the slot for manipulating the ladle member whereby the latter may be rotated into a position for withdrawal of the same through the slot.

5. A filler device for grease guns, comprising a tubular member having a slot at one side thereof, and a ladle member comprising a part operable in said tubular member for expelling grease therefrom and means for withdrawing the same through said slot.

In testimony whereof I affix my signature in presence of two witnesses.

WILLIAM HOVEY EDMUNDS.

Witnesses:
    Jos. T. Nossel,
    James M. Blackburn.